United States Patent [19]

Kondo et al.

[11] Patent Number: 5,096,956
[45] Date of Patent: Mar. 17, 1992

[54] LOW-VISCOSITY POLYOL COMPOSITION CONTAINING POTASSIUM TITANATE NEEDLE CRYSTAL

[75] Inventors: Kanemitsu Kondo, Anjo; Toshiaki Imokawa, Niihama; Shinichi Murakami, Niihama; Hideaki Nagayasu, Amagasaki, all of Japan

[73] Assignees: Sumitomo Bayer Urethane Co., Ltd., Hyogo; Toyota Jidosha Kabushiki Kaisha, Aichi, both of Japan

[21] Appl. No.: 523,411

[22] Filed: May 15, 1990

[30] Foreign Application Priority Data

May 16, 1989 [JP] Japan ............................. 1-122213

[51] Int. Cl.$^5$ ............................. C08J 3/20; C08K 3/10; C08L 75/08
[52] U.S. Cl. .................................................. 524/413
[58] Field of Search ........................................ 524/413

[56] References Cited

U.S. PATENT DOCUMENTS 4,806,615  2/1989  Rice et al. ............................. 528/68

FOREIGN PATENT DOCUMENTS 61-20717   6/1986  Japan .
61-501575  7/1986  Japan .
62-97808   5/1987  Japan .

OTHER PUBLICATIONS

Japanese Patent 61-20717—English Abstract.

*Primary Examiner*—Paul R. Michl
*Assistant Examiner*—U. K. Rajguru
*Attorney, Agent, or Firm*—Birch, Stewart, Kolasch & Birch

[57] ABSTRACT

A polyol composition with a viscosity at 25° C. of not higher than 50,000 cps which comprises (1) 100 parts by weight of a polyether polyol with a molecular weight of 2,000 to 10,000 prepared by addition of ethylene oxide and propylene oxide to a di- or tri-functional compound containing active hydrogen atoms, (2) 5 to 30 parts by weight of an aromatic diamine, (3) a solution of 0.5 to 5 parts by weight of fatty acid metal salt in an aliphatic amine and (4) 10 to 50 parts by weight of a potassium titanate needle crystal, which has low viscosity and can be easily handled in a molding step.

43 Claims, No Drawings

LOW-VISCOSITY POLYOL COMPOSITION CONTAINING POTASSIUM TITANATE NEEDLE CRYSTAL

BACKGROUND OF THE INVENTION

1. Field of the Invention

The present invention relates to a polyol composition which is a raw material for a polyurethane resin molded article, its preparation and a polyurethane resin molded article which is produced from it by a reaction injection molding process.

2. Description of the Related Art

Various reinforcing fillers substituting glass fibers are studied so as to improve surface gloss of a polyurethane resin molded article which is prepared by a reaction injection molding process (hereinafter referred to as "RIM process") from a polyol composition containing the reinforcing filler and so as to produce the molded article with good dimensional stability. Recently, calcium sulfate fiber, mica and the like are used in addition to potassium titanate needle crystal.

In order to improve productivity of the polyurethane resin molded article produced by the RIM process, a method in which a fatty acid metal salt as an internal mold release agent is beforehand mixed with a starting polyol composition, namely "IMR" is widely employed.

Since such fatty acid metal salt has poor compatibility with the polyol, it is proposed to improve the compatibility with the polyol by combining an aliphatic amine as a compatibilizing agent with the fatty acid metal salt, as described in Japanese Patent Kohyo Publication No. 501575/1986 and Japanese Patent Kokai Publication No. 97808/1987.

However, the potassium titanate needle crystal has high hygroscopicity and it is significantly moistened during long time storage. When the moistened potassium titanate needle crystal is dispersed in a polyol composition containing an aromatic diamine and a solution of a fatty acid metal salt in an aliphatic amine, the polyol composition has an increased viscosity and can be hardly handled in a molding step. The polyurethane resin molded article produced by the RIM process from such polyol composition in which the moistened potassium titanate needle crystal is dispersed does not necessarily satisfy the mold releasing property, surface conditions of the molded article and dimensional stability.

SUMMARY OF THE INVENTION

As a result of the study to solve these problems, it has been found that a polyol composition, which is obtained by dispersing a potassium titanate needle crystal in a polyether polyol and then mixing the dispersion with an aromatic diamine and a solution of a fatty acid metal salt in an aliphatic amine or by dispersing the potassium titanate needle crystal in a mixture of the polyether polyol and the aromatic diamine and then mixing the dispersion with the solution of the fatty acid metal salt in the aliphatic amine, has a low viscosity and can be easily handled in a molding step, and a polyurethane resin molded article prepared by the RIM process from said polyol composition has a good mold release property, good surface conditions and good dimensional stability.

The present invention provides a low-viscosity polyol composition with a viscosity at 25° C. of not higher than 50,000 cps which comprises (1) 100 parts by weight of a polyether polyol with a molecular weight of 2,000 to 10,000 prepared by addition of ethylene oxide (hereinafter referred to as "EO") and propylene oxide (hereinafter referred to as "PO") to a di- or tri-functional compound containing active hydrogen atoms, (2) 5 to 30 parts by weight of an aromatic diamine, (3) a solution of 0.5 to 5 parts by weight of a fatty acid metal salt in an aliphatic amine and (4) 10 to 50 parts by weight of a potassium titanate needle crystal.

The present invention also provides a method of preparing the polyol composition, and a polyurethane resin molded article prepared by a RIM process from an aromatic polyisocyanate and the polyol composition.

DETAILED DESCRIPTION OF THE INVENTION

The polyether polyol is a compound prepared by addition of EO and PO to a di- or tri-functional low-molecular weight compound containing active hydrogen atoms such as a polyol and an amino compound, for example, propylene glycol, glycerol, trimethylolpropane, triethanolamine and tolylenediamine, or a polyether polyamine with terminal amine groups prepared by modifying said compound with an amine. The polyether polyol has a molecular weight of 2,000 to 10,000 and primary end group ratio of at least 90%.

The aromatic diamine is a hindered aromatic diamine such as 1,3,5-triethyl-2,6-diaminobenzene, 3,3',5,5'-tetraethyl-4,4'-diaminodiphenylmethane, 1-methyl-3,5-diethyl-2,4-diamonobenzene, 1-methyl-3,5-diethyl-2,6-diaminobenzene and 1-methyl-5-tert.-butyl-2,4-diaminobenzene. 1-Methyl-3,5-diethyl-2,4-diaminobenzene and 1-methyl-5-tert-butyl-2,4-diaminobenzene are preferable. The aromatic diamine is used in an amount of 5 to 30 parts by weight, preferably 15 to 25 parts by weight based on 100 parts by weight of the polyether polyol.

The fatty acid metal salt is a metal salt of a fatty acid with at least 10 carbon atoms such as sodium stearate, zinc stearate, zinc oleate and zinc laurate. Zinc stearate is preferable. The fatty acid metal salt is used in an amount of 0.5 to 5 parts by weight, preferably 1.5 to 4 parts by weight based on 100 parts by weight of the polyether polyol.

The aliphatic amine is a mixture of polyether with terminal amine groups and an amine base polyether polyol with a molecular weight of at most 800, or is an adduct of PO to ethylene diamine. The aliphatic amine is used in a sufficient amount for dissolving the fatty acid metal salt. The aliphatic amine is usually used in an amount of 1 to 5 parts by weight based on 1 part by weight of the fatty acid metal salt.

The potassium titanate needle crystal is a needle crystal with a diameter of not larger than 1 $\mu$m consisting of potassium titanate expressed by $K_2O \cdot 4TiO_2$ or $K_2O \cdot 6TiO_2$. The needle crystal of $K_2O \cdot 6TiO_2$ with the diameter of 0.2 to 0.5 $\mu$m is preferable. The potassium titanate needle crystal is used in an amount of 10 to 50 parts by weight, preferably 15 to 40 parts by weight based on 100 parts by weight of the polyether polyol.

The low-viscosity polyol composition according to the present invention can be prepared by dispersing the potassium titanate needle crystal in the polyether polyol and then mixing the dispersion with the aromatic diamine and the solution of the fatty acid metal salt in the aliphatic amine, or by dispersing the potassium titanate needle crystal in the mixture of the polyether polyol and the aromatic diamine and then mixing the dispersion with the solution of the fatty acid metal salt in the aliphatic amine.

The low-viscosity polyol composition has a viscosity at 25° C. of not higher than 50,000 cps measured with a No. 4 rotor of B-type rotary viscometer at a rate of 6 rpm.

Examples of materials which are optionally added to the low-viscosity polyol composition are an organic silicone base foam stabilizer, a foaming agent such as Freon, a flame-retardant, a reaction catalyst and an antioxidant.

The reaction between the aromatic polyisocyanate and the low-viscosity polyol composition is carried out in the presence of the reaction catalyst by using a high pressure reaction injecting molding machine so that an equivalent ratio of an isocyanate group to an active hydrogen atom-containing group (hereinafter referred to as "isocyanate index") is 0.8 to 1.5.

The aromatic polyisocyanate is modified diphenyl methane diisocyanate (hereinafter referred to as "modified MDI"), for example, MDI with a urethane linkage or a urea linkage prepared by reacting MDI with a polyalcohol or a polyamine, and MDI with a carbodiimide linkage or a uretoneimine linkage prepared by reacting MDI in the presence of a modifying catalyst or in the application of the heat.

The reaction catalyst is a tertiary amine such as triethylenediamine or an organic metal compound such as dimetyltin dilaurate or dibutyltin dilaurate.

The polyurethane resin molded article prepared by the RIM process can be used as a bumper, a fender or a side protector as such or after coated with a coating such as polyurethane.

The polyurethane resin molded article according to the present invention has a good mold release property, good surface conditions and good dimensional stability.

PREFERRED EMBODIMENTS OF THE INVENTION

The present invention is illustrated by following Examples.

Examples 1 and 2

A potassium titanate needle crystal was dispersed in a polyether polyol beforehand mixed with an aromatic diamine and a reaction catalyst. A solution of a fatty acid metal salt in an aliphatic amine was added to the dispersion.

A viscosity of the resultant polyol composition was measured at 25° C. by using a No. 4 rotor of B-type rotary viscometer at a rate of 6 rpm.

The polyol composition and a glycol-modified MDI were charged in feed tanks of a high pressure reaction injection molding machine at the isocyanate index indicated in Table. A feed amount was adjusted to 700 g/sec and a feed pressure was adjusted to 180 kg/cm$^2$.

The feed material was injected for 1.2 seconds in a temperature-adjustable steel closed mold having a depth of 3 mm, a width of 300 mm and a length of 900 mm. The feed material was kept at a temperature of 40° to 50° C., and the mold was kept at a temperature of 70° C. The reaction temperature was 130° to 150° C. After 30 seconds from the injection, the reaction mixture was removed from the mold to obtain a polyurethane resin molded article.

A mold release property was evaluated by the number of molding times until the reaction mixture cannot be continuously removed from the mold (hereinafter referred to as "mold release number"). In the polyurethane resin molded article which could be continuously removed from the mold, a surface condition was evaluated by average number of pinholes. Dimensional stability was evaluated by a thermal coefficient of linear expansion (ASTM D-696-70). The results are shown in Table.

Comparative Examples 1 and 2

In the same manner as in Example 1 except that after the solution of the fatty acid metal salt in the aliphatic amine was mixed with the polyether polyol containing the aromatic diamine and the reaction catalyst, the potassium titanate needle crystal was dispersed in the mixture (Comparative Example 1), or a calcium sulfate fiber was used in place of the potassium titanate needle crystal (Comparative Example 2), the polyol composition was prepared. The viscosity of the polyol composition was measured. In the same manner as in Example 1, the molded article was produced. The mold release number, the average number of pinholes and the thermal coefficient of linear expansion were measured. The results are shown in Table.

TABLE

| | Example No. | | | |
|---|---|---|---|---|
| | 1 | 2 | Com. 1 | Com. 2 |
| Potassium titanate needle crystal (parts by weight) | 30 | 17 | 30 | — |
| Calcium sulfate fiber (parts by weight) | — | — | — | 30 |
| Polyether polyol (parts by weight) | 76 | 80 | 76 | 80 |
| Aromatic diamine (parts by weight) | 20 | 16 | 20 | 16 |
| Reaction catalyst 1 (parts by weight) | 0.1 | 0.1 | 0.1 | 0.1 |
| Reaction catalyst 2 (parts by weight) | 0.1 | 0.1 | 0.1 | 0.1 |
| Fatty acid metal salt (parts by weight) (solution in aliphatic amine) | 4 | 4 | 4 | 4 |
| Viscosity of the polyol composition (cps) (at 25° C.) | 30,000 | 10,000 | 70,000 | 60,000 |

TABLE-continued

| | Example No. | | | |
|---|---|---|---|---|
| | 1 | 2 | Com. 1 | Com. 2 |
| Isocyanate index | 1.05 | 1.05 | 1.05 | 1.05 |
| Mold release number (times) | 50 | 60 | 30 | 40 |
| Number of pinholes | 2 | 1 | 10 | 5 |
| Thermal coefficient of linear expansion ($10^{-6}/°C$) | 30 | 50 | 30 | 50 |

Note)

Potassium titanate needle crystal: Tismo-D ($K_2O \cdot 6TiO_2$ needle crystal with a diameter of 0.2 to 0.5 μm) manufactured by Ohtsuka Chemical Calcium sulfate fiber: Franklin fiber A-30 manufactured by Zipsam Polyether polyol: Polyether polyol with a primary end group ratio of 95% and a molecular weight of 6,000 prepared by addition of EO and PO to glycerol Aromatic diamine: A mixture of 1-methyl-3,5-diethyl-2,4-diaminobenzene and 1-methyl-3,5-diethyl-2,6-diaminobenzene Reaction catalyst 1: A mixture of triethylenediamine and dipropylene glycol Reaction catalyst 2: Dibutyltin dilaurate Fatty acid metal salt (solution in aliphatic amine): A solution of zinc stearate in an adduct of PO to ethylene diamine

What is claimed is:

1. A low-viscosity polyol composition with a viscosity at 25° C. of not higher than 50,000 cps which comprises (1) 100 parts by weight of a polyether polyol with a molecular weight of 2,000 to 10,000 prepared by addition of ethylene oxide and propylene oxide to a di- or tri-functional compound containing active hydrogen atoms, (2) 5 to 30 parts by weight of an aromatic diamine, (3) a solution of 0.5 to 5 parts by weight of a fatty acid metal salt in an aliphatic amine and (4) 10 to 50 parts by weight of a potassium titanate needle crystal, and which is of low viscosity such that it possesses a viscosity at 25° C. of not higher than 50,000 cps.

2. The polyol composition according to claim 1, wherein the polyether polyol is a compound prepared by addition of ethylene oxide and propylene oxide to the di- or tri-functional low-molecular weight compound containing the active hydrogen atoms or is a polyether polyamine with terminal amine group prepared by modifying said compound with an amine.

3. The polyol composition according to claim 1, wherein the aromatic diamine is a hindered aromatic diamine.

4. The polyol composition according to claim 1, wherein the aromatic diamine is at least one selected from the group consisting of 1,3,5-triethyl-2,6-diaminobenzene, 3,3',5,5'-tetraethyl-4,4'-diaminodiphenylmethane, 1-methyl-3,5-diethyl-2,4-diaminobenzene, 1-methyl-3,5-diethyl-2,6-diaminobenzene and 1-methyl-5-tert-butyl-2,4-diaminobenzene.

5. The polyol composition according to claim 1, wherein the fatty acid metal salt is a metal salt of a fatty acid with at least 10 carbon atoms.

6. The polyol composition according to claim 5, the fatty acid metal salt is at least one selected from the group consisting of sodium stearate, zinc stearate, zinc oleate and zinc laurate.

7. The polyol composition according to claim 1, the aliphatic amine is a mixture of a polyether with terminal amine group and an amine base polyether polyol with a molecular weight of not higher than 800, or an adduct of propylene oxide to ethylene diamine.

8. The polyol composition according to claim 1, the potassium titanate needle crystal is a needle crystal with a diameter of not larger than 1 μm consisting of potassium titanate expressed by $K_2O \cdot 4TiO_2$ or $K_2O \cdot 6TiO_2$.

9. A method of preparing the polyol composition according to claim 1, which comprises dispersing a potassium titanate needle crystal in a polyether polyol and then mixing the dispersion with an aromatic diamine and a solution of a fatty acid metal salt in an aliphatic amine.

10. A method of preparing the polyol composition according to claim 1, which comprises dispersing a potassium titanate needle crystal in a mixture of a polyether polyol and an aromatic diamine and then mixing the dispersion with a solution of a fatty acid metal salt in an aliphatic amine.

11. A polyurethane resin molded article which is prepared by a reaction injection molding process from an aromatic polyisocyanate and the polyol composition according to claim 1.

12. The polyol composition according to claim 1, wherein said di- or tri-functional compound is selected from the group consisting of propylene glycol, glycerol, trimethylolpropane, triethanolamine, tolylenediamine, and a polyether polyamine with terminal amine groups prepared by modifying said compound with an amine.

13. The polyol composition according to claim 4, wherein said aromatic diamine is at least one selected from the group consisting of 1-methyl-3,5-diethyl-2,4-diaminobenzene and 1-methyl-5-tert-butyl-2,4-diaminobenzene.

14. The polyol composition according to claim 1, wherein said aromatic diamine is present in an amount of 15 to 25 parts by weight based on 100 parts by weight of said polyether polyol.

15. The polyol composition according to claim 6, wherein said fatty acid metal salt is zinc stearate.

16. The polyol composition according to claim 1, wherein said fatty acid metal salt is present in amount of 1.5 to 4 parts by weight based on 100 parts by weight of said polyether polyol.

17. The polyol composition according to claim 1, wherein said aliphatic amine is present in an amount of 1 to 5 parts by weight based on 1 part by weight of said fatty acid metal salt.

18. The polyol composition according to claim 8, wherein said potassium titanate needle crystal is a needle crystal of $K_2O \cdot 6TiO_2$ with a diameter of 0.2 to 5 μm.

19. The polyol composition according to claim 1, wherein said potassium titanate needle crystal is present in an amount of 15 to 40 parts by weight based on 100 parts by weight of said polyether polyol.

20. The polyol composition according to claim 1, which further comprises a material selected from the group consisting of an organic silicone base foam stabilizer, a foaming agent, a flame-retardant, a reaction catalyst, and an antioxidant.

21. The polyol composition according to claim 20, wherein said foaming agent is Freon.

22. The polyurethane resin molded article according to claim 11, wherein said reaction is carried out in the presence of a reaction catalyst by using a high pressure reaction injecting molding machine so that an equivalent ratio of an isocyanate group to an active hydrogen atom-containing group is 0.8 to 1.5.

23. The polyurethane resin molded article according to claim 11, wherein said aromatic polyisocyanate is modified diphenyl methane diisocyanate.

24. The polyurethane resin molded article according to claim 23, wherein said modified diphenyl methane diisocyanate has a urethane linkage or a urea linkage prepared by reacting said modified diphenyl methane diisocyanate with a polyalcohol or a polyamine, or by reacting said modified diphenyl methane diisocyanate with a carbodiimide linkage or a uretoneimine linkage prepared by reacting said modified diphenyl methane diisocyanate in the presence of a modifying catalyst or by the application of heat.

25. The polyurethane resin molded article according to claim 22, wherein said reaction catalyst is a tertiary amine.

26. The polyurethane resin molded article according to claim 25, wherein said tertiary amine is triethylenediamine.

27. The polyurethane resin molded article according to claim 22, wherein said reaction catalyst is an organic metal compound.

28. The polyurethane resin molded article according to claim 27, wherein said metal organic compound is dimetyltin dilaurate or dibutyltin dilaurate.

29. The polyurethane resin molded article according to claim 11, which is in the form of a bumper, a fender, or a side protector, which is coated or uncoated.

30. The method according to claim 9, wherein said polyether polyol is a compound prepared by addition of ethylene oxide and propylene oxide to said di- or tri-functional low molecular weight compound containing said active hydrogen atoms or which is a polyether polyamide with terminal amide groups prepared by modifying said compound with an amine.

31. The method according to claim 9, wherein said aromaic diamine is a hindered aromatic diamine.

32. The method according to claim 9, wherein said aromatic diamine is at least one selected from the group consisting of 1,3,5-triethyl-2,6-diaminobenzene, 3,3',5,5'-tetraethyl-4,4'-diaminodiphenylmethane, 1-methyl-3,5-diethyl-2,4-diaminobenzene, 1-methyl-3,5-diethyl-2,6-diaminobenzene and 1-methyl-5-tert-butyl-2,4-diaminobenzene.

33. The method according to claim 9, wherein said fatty acid metal salt is a metal salt of a fatty acid with at least ten carbon atoms.

34. The method according to claim 9, wherein said fatty acid metal salt is at least one selected from the group consisting of sodium stearate, zinc stearate, zinc oleate and zinc laurate.

35. The method according to claim 9, wherein said aliphatic amine is a mixture of a polyether with terminal amine groups and an amine base polyether polyol with a molecular weight of not higher than 800, or an adduct of propylene oxide to ethylene diamine.

36. The method according to claim 9, wherein said potassium titanate needle crystal is a needle crystal with a diameter of not larger than 1 μm consisting of potassium titanate expressed by $K_2O \cdot 4TiO_2$ or $K_2O \cdot 6TiO_2$.

37. The method according to claim 10, wherein said polyether polyol is a compound prepared by addition of ethylene oxide and propylene oxide to said di- or tri-functional low molecular weight compound containing said active hydrogen atoms or which is a polyether polyamine with terminal amine groups prepared by modifying said compound with an amine.

38. The method according to claim 10, wherein said aromatic diamine is a hindered aromatic diamine.

39. The method according to claim 10, wherein said aromatic diamine is at least one selected from the group consisting of 1,3,5-triethyl-2,6-diaminobenzene, 3,3',5,5'-tetraethyl-4,4'-diaminodiphenylmethane, 1-methyl-3,5-diethyl-2,4-diaminobenzene, 1-methyl-3,5-diethyl-2,6-diaminobenzene and 1-methyl-5-tert-butyl-2,4-diaminobenzene.

40. The method according to claim 10, wherein said fatty acid metal salt is a metal salt of a fatty acid with at least ten carbon atoms.

41. The method according to claim 10, wherein said fatty acid metal salt is a least one selected from the group consisting of sodium stearate, zinc stearate, zinc oleate and zinc laurate.

42. The method according to claim 10, wherein said aliphatic amine is a mixture of a polyether with terminal amine groups and an amine base polyether polyol with a molecular weight of not higher than 800, or an adduct of propylene oxide to ethylene diamine.

43. The method according to claim 10, wherein said potassium titanate needle crystal is a needle crystal with a diameter of not larger than 1 μm consisting of potassium titanate expressed by $K_2O \cdot 4TiO_2$ or $K_2O \cdot 6TiO_2$.

* * * * *